United States Patent
Tachikawa

(10) Patent No.: US 7,684,810 B2
(45) Date of Patent: Mar. 23, 2010

(54) TRUNKING SYSTEM CONTROL METHOD

(75) Inventor: Katsuhiko Tachikawa, Sagamihara (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 217 days.

(21) Appl. No.: 10/582,012

(22) PCT Filed: Dec. 7, 2004

(86) PCT No.: PCT/JP2004/018541

§ 371 (c)(1),
(2), (4) Date: Jun. 7, 2006

(87) PCT Pub. No.: WO2005/057974

PCT Pub. Date: Jun. 23, 2005

(65) Prior Publication Data

US 2007/0105551 A1 May 10, 2007

(30) Foreign Application Priority Data

Dec. 10, 2003 (JP) ............................. 2003-412233

(51) Int. Cl.
*H04W 72/00* (2009.01)
(52) U.S. Cl. .................... 455/464; 455/426.1; 455/453; 455/520; 370/341; 370/327
(58) Field of Classification Search ......... 455/400–466, 455/550–575.9, 426.1; 370/327, 340
See application file for complete search history.

(56) References Cited

U.S. PATENT DOCUMENTS

| 5,239,678 | A | * | 8/1993 | Grube et al. | ................. 455/511 |
| 5,442,809 | A | * | 8/1995 | Diaz et al. | ................... 455/511 |
| 5,590,400 | A | * | 12/1996 | Lopponen | .................... 455/509 |

(Continued)

FOREIGN PATENT DOCUMENTS

GB 2 328 586 2/1999

(Continued)

OTHER PUBLICATIONS

International Preliminary Examination Report Dated Sep. 9, 2006 for PCT/JP2004/018541.

(Continued)

*Primary Examiner*—Rafael Pérez-Gutiérrez
*Assistant Examiner*—Issam Chakour
(74) *Attorney, Agent, or Firm*—Eric J. Robinson; Robinson Intellectual Property Law Office, P.C.

(57) ABSTRACT

The present invention relates to a radio communication trunking system control method. According to the control method, a channel (f1), which is normally used as a control channel, is used as a telephone communication channel when a plurality of channels (f2-fn), used as telephone communication channels, are being used. For example, the channel (fn) has been adapted to be able to operate not only as a telephone communication channel but also as a control channel. When the telephone communication using the channel (fn) is completed, the channel (fn) is established as a control channel in place of the channel (f1). In this way, the currents consumed by wireless units accommodated in a trunking system can be reduced, and the time period for which the trunk operation is inoperative can be significantly reduced.

1 Claim, 5 Drawing Sheets

U.S. PATENT DOCUMENTS

| | | | |
|---|---|---|---|
| 6,240,298 B1 * | 5/2001 | Hayata | 455/511 |
| 6,526,030 B2 * | 2/2003 | Rezaiifar et al. | 370/335 |

FOREIGN PATENT DOCUMENTS

| | | |
|---|---|---|
| JP | 03-242052 | 10/1991 |
| JP | 05-032933 | 5/1993 |
| JP | 06-343057 | 12/1994 |
| JP | 09-507624 | 7/1997 |
| JP | 2724917 | 3/1998 |
| JP | 11-032366 | 2/1999 |
| WO | WO 95/19687 | 7/1995 |

OTHER PUBLICATIONS

International Search Report for PCT/JP2004/018541.
Office Action (Application Serial No. 2003-412233) dated May 20, 2008.

* cited by examiner

TRANSMIT FRAME

TRUNKING SYSTEM CONTROL METHOD

TECHNICAL FIELD

The present invention relates to a trunking system control method for use in a radio communication system.

BACKGROUND ART

Regarding a wide frequency bandwidth trunked radio communication system, an analog trunking system using a control channel and a telephone communication channel has been described in Japanese Patent No. 2724917 specification 1. In the analog trunking system according to this Patent Document, when all telephone communication channels are busy, a control channel for communicating control signals is used as a telephone communication channel, whereby all wireless relay channels are assigned as telephone communication channels. However, the above analog trunking system of the Patent Document has the following problems.

Specifically, when all telephone communication channels are busy, a control channel is used as a telephone communication channel, and thus a state where there exists no control channel temporarily occurs. In such state, a wireless unit accommodated by a wireless relay having a control channel cannot await a control signal. Accordingly, the wireless unit will frequently perform scanning operation, thus increasing current consumption.

A further problem is that when a control channel is switched to a telephone communication channel, in the site using the channel, the trunk operation cannot be performed until the telephone communication by the above channel is completed.

An object of the present invention is to make switching between control channel and telephone communication channel more efficient and to reduce current consumption in a wireless unit and at the same time to reduce the time period for which the trunk operation is inoperative.

DISCLOSURE OF THE INVENTION

To achieve the above object of the present invention, a control method for a trunking system is provided according to the present invention, the trunking system performing exchange between a wireless unit and the other communication party by means of control signal communication with the wireless unit by use of a control channel, and thereby allowing communication signal communication using a selected telephone communication channel between the wireless unit and the other communication party. In the control method, there are performed: when all the telephone communication channels are busy when a new request for the telephone communication channel comes from the wireless unit, performing a telephone communication channel making processing for using the control channel as a telephone communication channel; when any of the busy telephone communication channels is released when the control channel is used as a telephone communication channel, performing a control channel shifting processing for setting the released telephone communication channel as a new control channel, and by using all channels, notifying a plurality of the wireless units that the released telephone communication channel currently acts as a new control channel, and when the control channel originally set is used as a telephone communication channel, inserting information indicating a usage state of the telephone communication channel being used as the new control channel and a usage state of neighboring channels in an overlapped manner into information transmitted via the downlink communication of the control channel originally set so as to notify a wireless unit currently making a telephone call using the control channel originally set of these usage states, to perform a control channel usage state notifying processing.

In the trunking system control method according to the present invention, when all telephone communication channels are busy, the control channel is used as a telephone communication channel. Then when an idle telephone communication channel emerges, the telephone communication channel is used as a control channel. Accordingly, the time period for which there exists no control channel for transmitting/receiving a control signal is shortened, and wireless unit current consumption is reduced and at the same time, the time period for which the trunk operation cannot be performed can be reduced.

Furthermore, in the trunking system control method according to the present invention, when all telephone communication channels are busy, the control channel is used as a telephone communication channel. Then when an idle telephone communication channel emerges, a communication signal which has been communicated by use of the control channel is transmitted/received by use of the idle telephone communication channel. Accordingly, the time period for which there exists no control channel for transmitting/receiving a control signal is shortened, and wireless unit current consumption is reduced and at the same time, the time period for which the trunk operation cannot be performed can be reduced.

EMBODIMENTS OF THE INVENTION

Embodiments of the present invention will be described below in detail with reference to the drawings.

First Embodiment

Figure 1:
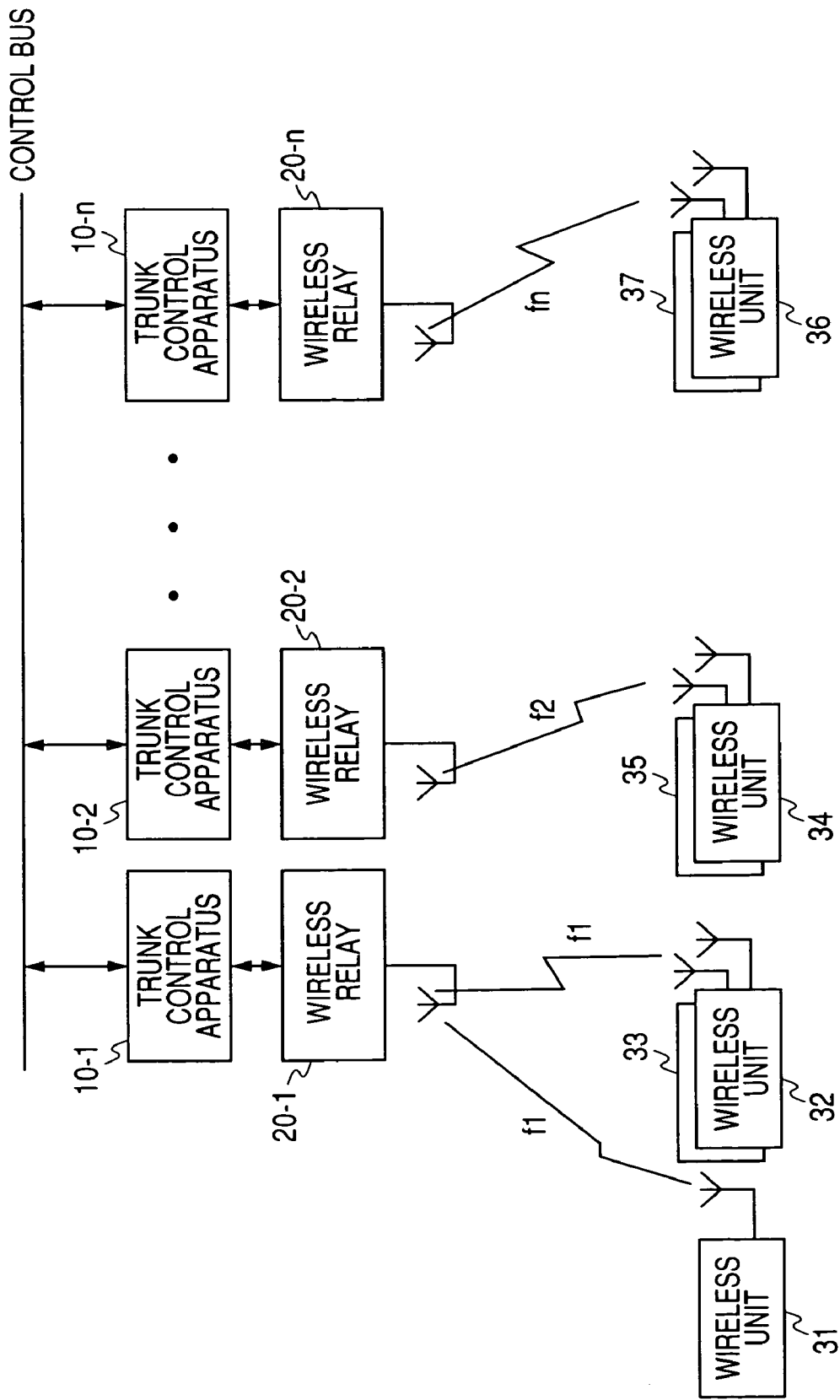
FIG. 1 is a configuration diagram showing a trunking system according to a first embodiment of the present invention.

FIG. 1 is a configuration diagram showing a trunking system according to a first embodiment of the present invention.

The trunking system includes a plurality of trunk control apparatuses 10-1, 10-2, . . . , and 10-n (n is a natural number of two or more).

The trunk control apparatuses 10-1 to 10-n are connected to each other via a control bus.

Wireless relays 20-2, . . . , and 20-n are connected to the trunk control apparatuses 10-1 to 10-n, respectively.

In the trunking system, control signal communication with a plurality of wireless units 31, 32, 33, 34, 35, 36 and 37 is performed using a control channel, whereby exchange between the wireless unit and the other communication party is performed.

Each of the wireless relays 20-1 to 20-$n$ is an apparatus relaying communication between the wireless units 31, 32, 33, 34, 35, 36 and 37, constituted of a mobile communication unit or the like, and the trunk control apparatuses 10-1, 10-2, . . . , and 10-$n$, and includes a radio transmitter/receiver performing, for example, four value modulation/demodulation, and a voice coder and a voice decoder.

The wireless relay 20-1 uses channel f1 in communicating with the wireless units 31 to 37. This channel f1 is used as a control channel for transmitting/receiving a control signal, but also used as a telephone communication channel for transmitting/receiving a telephone communication signal. This channel f1, normally used as a control channel, is registered with the wireless units 31 to 37. The wireless units 31 to 37 scan a control signal by channel f1.

The wireless relays 20-2 to 20-$(n-1)$ use channels f2 to f(n−1) in communicating with the wireless units 31 to 37, respectively. Channel f2 to f(n−1) are used as telephone communication channels for transmitting/receiving a communication signal.

The wireless relay 20-$n$ uses channel fn in communicating with the wireless units 31 to 37. Similarly to channel f1, channel fn is used as a telephone communication channel for transmitting/receiving a telephone communication signal, but can also be used as a control channel for transmitting/receiving a control signal.

The operation of the trunking system will now be described.

When communication between any one of the wireless units 31 to 37 and the other communication party is started, a control signal is transmitted/received between the wireless relay 20-1 and any one of the wireless units 31 to 37. In the control signal communication, channel f1 is used as a control channel. After the communication between the wireless units 31 to 37 and the other communication party is started, channels f2 to f(n−1) or channel fn are selected and used, and telephone communication signals are transmitted/received between the wireless relays 20-2 to 20-$n$ and the wireless unit 31 to 37, and thus telephone communication signals are transmitted/received to/from the other communication party. In this case, channel fn is used as a telephone communication channel.

When channels f2 to f(n−1) and fn are used as a telephone communication channel and become busy, channel f1 of the wireless relay 20-1 is set as a telephone communication channel, and telephone communication signals are transmitted/received to/from the wireless relays 31 to 37 by use of channel f1. Accordingly, even when further facility investment is not made, the number of available telephone communication channels is increased. It is noted that the telephone communication channel making processing of setting channel f1 as a telephone communication channel is a known technique, and hence a detailed explanation thereof is omitted here.

When telephone communication signals are transmitted/received by using channel f1 as a telephone communication channel, when communication using channel fn of the wireless relay 20-$n$ is completed, this is detected by the trunk control apparatuses 10-1 to 10-$n$, and channel fn will be used as a control channel. More specifically, information such that channel fn will be used as a control channel from now on, is notified to the wireless units 31 to 37 by use of all channels f1 to fn. The wireless units 31 to 37 hold this information, and use channel fn as a control channel instead of channel f1 until subsequent information is supplied. Accordingly, starting just after any one of channels f1 to f(n−1) is released, the trunk operation based on a control signal becomes possible.

When channel f1 which has been used as a control channel until then, is used as a telephone communication channel, the trunk control apparatus 20-1 inserts in an overlapped manner into information transmitted via the downlink communication of channel f1, information indicating the usage state of channel fn acting as a control channel and the usage state of neighboring channels, and thereby notifies the information to the wireless unit currently making a telephone call or a scanning operation. When such usage state notifying processing is performed, the wireless unit which has been using channel f1 can perform quick switching to another channel. An outline of the usage state notifying processing will be described with reference to FIGS. 2 to 4.

Figure 2:
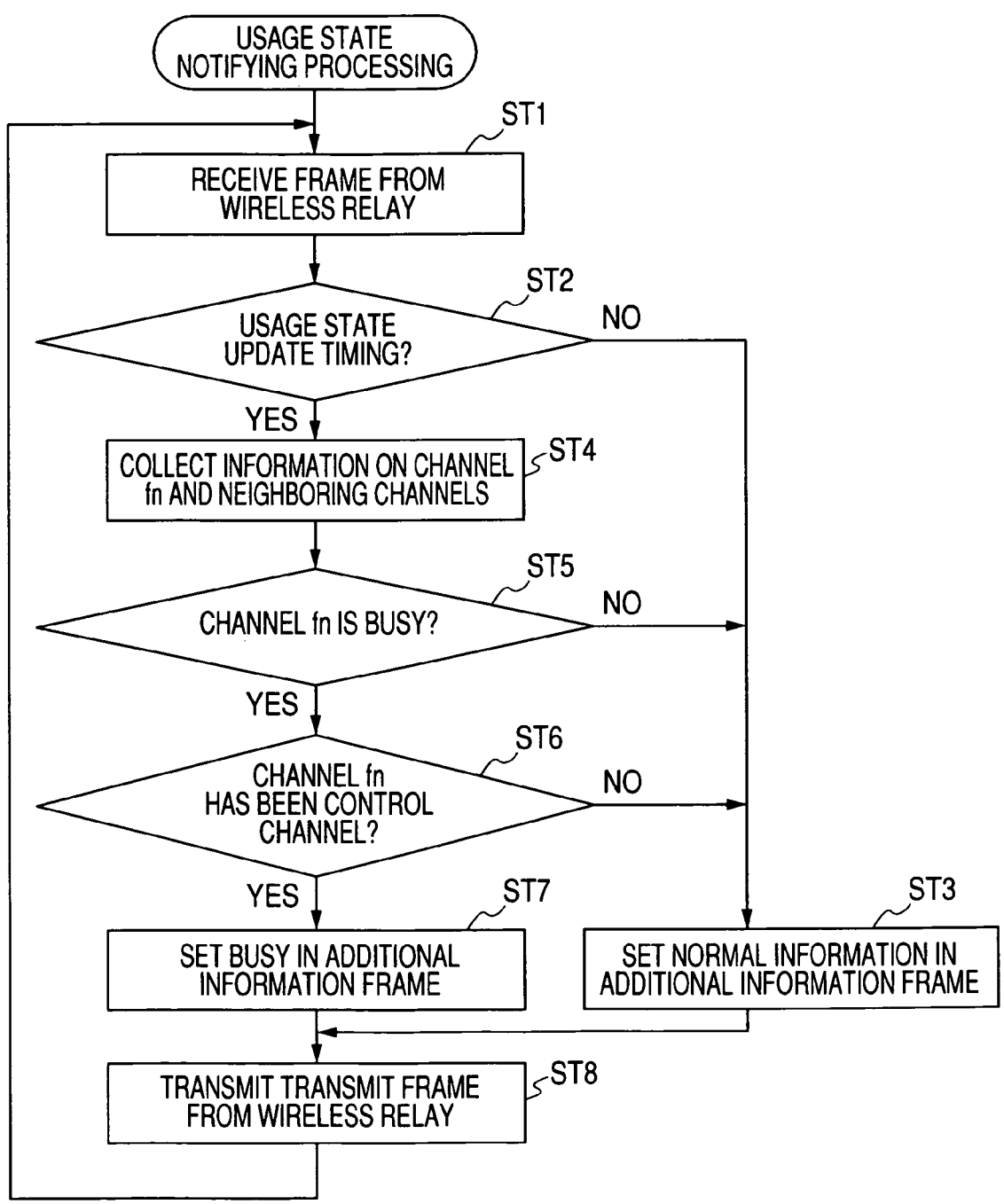
FIG. 2 is a flowchart showing an outline of a usage state notifying processing.
Figure 3:
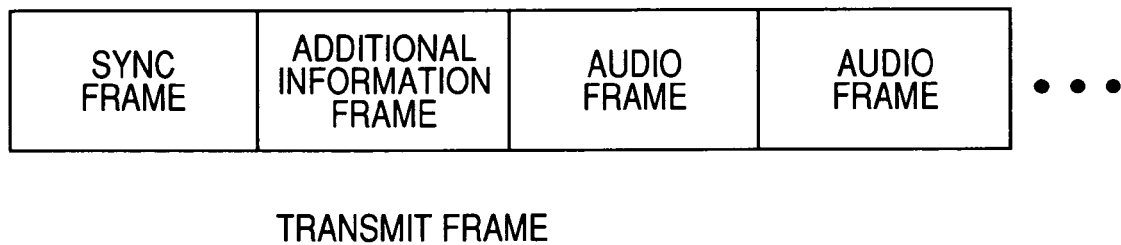
FIG. 3 is a view showing a frame format containing a telephone communication signal.
Figure 4:
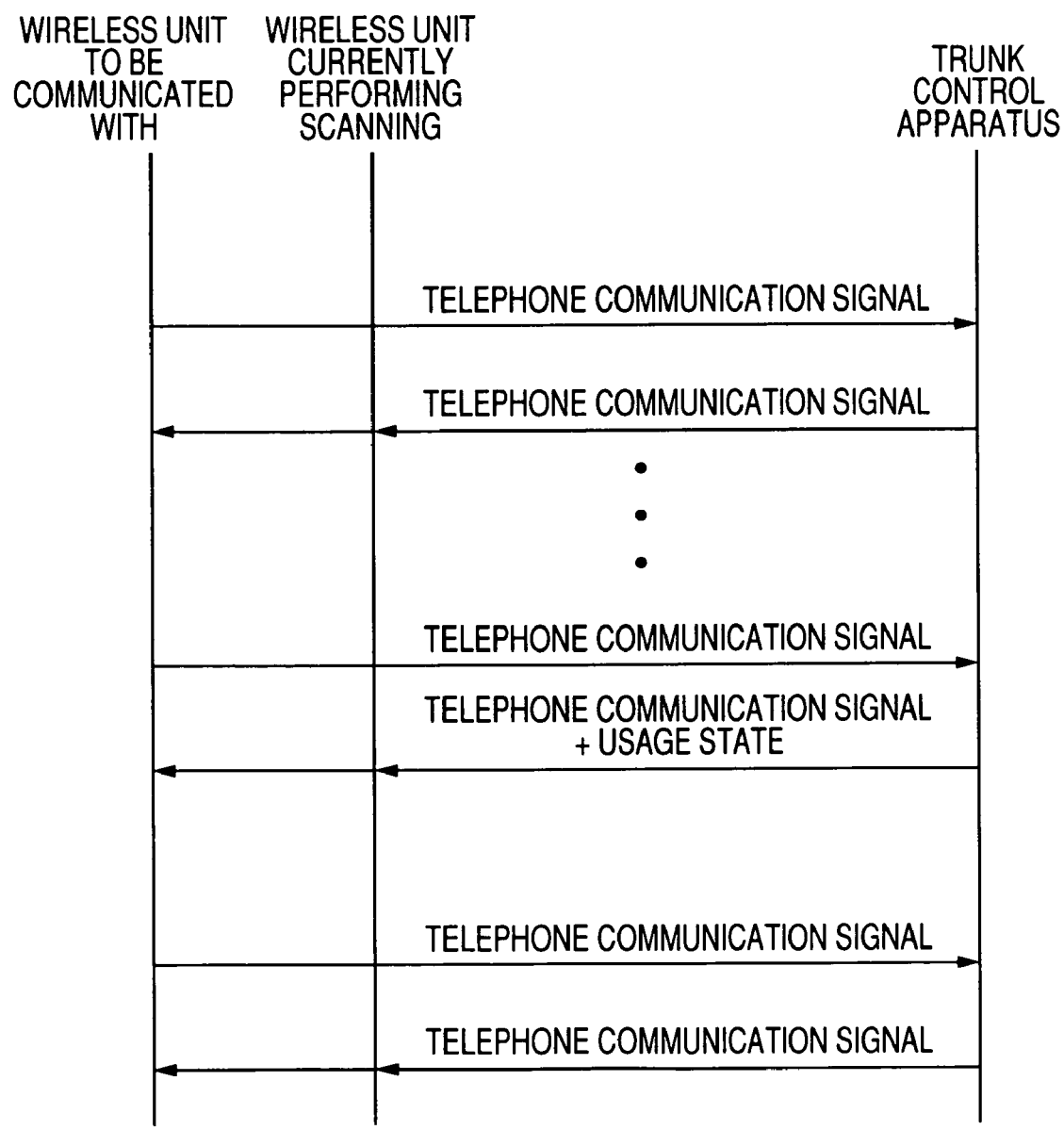
FIG. 4 is a sequence diagram of the usage state notifying processing.

FIG. 2 is a flowchart showing an outline of the usage state notifying processing. FIG. 3 is a view showing a frame format containing a telephone communication signal. FIG. 4 is a sequence diagram of the usage state notifying processing.

The trunk control apparatus 10-1 receives from the wireless relay 20-1 a frame containing a telephone communication signal (step ST1).

In transmitting downward a telephone communication signal to the wireless units 31 to 37, the transmit frame is constituted of a sync frame, an additional information frame and audio frames as shown in FIG. 3. The trunk control apparatus 10-1 determines whether or not it is an update timing of the usage state of the control channel fn and neighboring channels. If it is not an update timing (step ST2: NO), normal information is set in the additional information frame (step ST3).

If it is an update timing of the usage state of the control channel fn and neighboring channels (step ST2: YES), the trunk control apparatus 10-1 acquires the usage state of the control channel fn and neighboring channels via the other trunk control apparatuses 10-2 to 10-N (step ST4).

The trunk control apparatus 10-1 determines whether or not channel fn is busy and if not so (step ST5: NO), performs step ST3. If channel fn is busy (step ST5: YES), the trunk control apparatus 10-1 determines whether or not channel fn is currently used as a control channel (step ST6).

If channel fn is not currently used as a control channel (step ST6: NO), the trunk control apparatus 10-1 performs step ST3. If channel fn is currently used as a control channel (step ST6: YES), the trunk control apparatus 10-1 sets into the additional information of the transmit frame, information indicating the usage state of the control channel and the usage state of the neighboring channels (step ST7).

At the time when step ST3 or step ST7 is completed, the trunk control apparatus 10-1 transmits the transmit frame from the wireless relay 20-1 to the wireless unit (the wireless unit to be communicated with) currently using channel f1 (step ST8).

When steps ST1 to ST8 are repeated, the usage state of channel fn acting as a control channel and the usage state of the neighboring channels are periodically supplied to the wireless unit to be communicated with, as shown in FIG. 4.

As described above, according to the present embodiment, channel f1 which has been used as a control channel, is used as a telephone communication channel, and when channel fn is released, this channel fn is set as a control channel. Accordingly, a state in which there exists no control channel is prevented from continuing long, thus allowing reduction of wasted current consumption in the wireless units 31 to 37 and at the same time allowing shortening of the time period for which the trunk operation cannot be performed.

Second Embodiment

According to the above first embodiment, channel f1 which has been used as a control channel, is used as a telephone communication channel, and when channel fn is released, this channel fn is fixedly set as a control channel.

Figure 5:
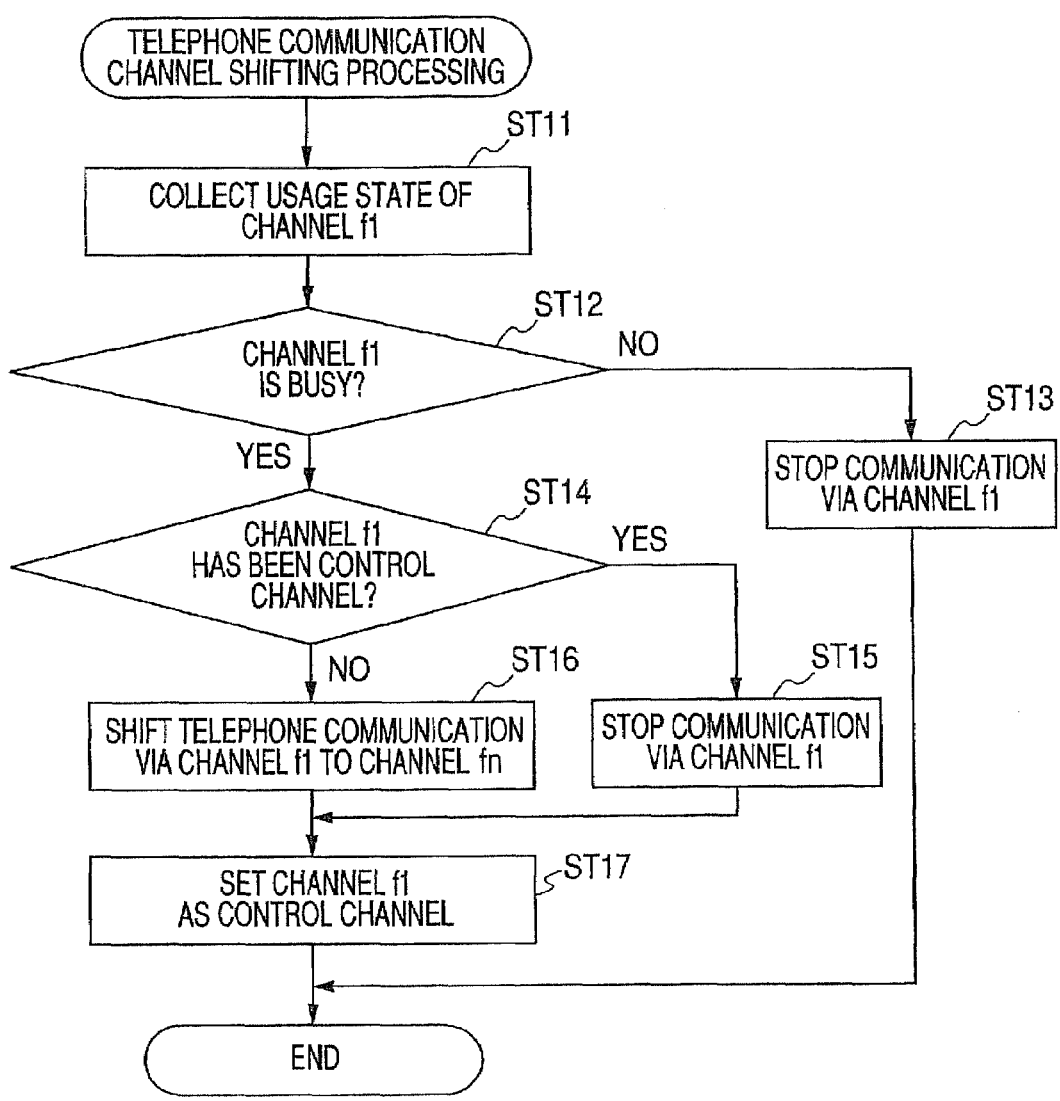
FIG. 5 is a flowchart showing a telephone communication channel shifting processing according to a second embodiment of the present invention.

According to this second embodiment, when channel f1 is used as a telephone communication channel, a telephone communication channel shifting processing is performed, whereby the telephone communication channel is shifted to channel fn, and the control channel is again returned to channel f1 (refer to FIG. 5).

FIG. 5 is a flowchart showing a telephone communication channel shifting processing according to the second embodiment of the present invention.

In a state in which all telephone communication channels are busy, channel f1 which has been a control channel until then, is changed to a telephone communication channel, and channel f1 performs transmission/reception of telephone communication signals. When detecting via the trunk control apparatus 10-n that channel fn has been released, the trunk control apparatus 10-1 performs the following steps ST11 to ST16.

Firstly the trunk control apparatus 10-1 collects the state of channel f1 (step ST11) and determines whether or not channel f1 is busy (step ST12). If channel f1 is not busy (step ST12: NO), the use of channel f1 is stopped (step ST13). Specifically, its use as a telephone communication channel is stopped.

If channel f1 is busy (step ST12: YES), it is determined in step ST14 whether or not channel f1 has been used as a control channel. If so (step ST14: YES), the use of channel f1 as a telephone communication channel is stopped (step ST15).

If channel f1 has not been used as a control channel (step ST14: NO), the trunk control apparatus 10-1 performs shifting from communication using channel f1 to communication using channel fn (step ST16).

After the processing of step ST15 or step ST16, the trunk control apparatus 10-1 sets channel f1 as a control channel for transmitting/receiving a control channel (step ST17).

As described above, according to the present embodiment, when channel fn is released, communication which has been using channel f1 as a telephone communication channel is shifted to channel fn and channel f1 is again restored to a control channel. Accordingly, when channel fn is released, there exists again a control channel, whereby a state in which there exists no control channel is prevented from continuing long. Therefore, wasted current consumption in the wireless units 31 to 37 can be reduced and at the same time the time period for which the trunk operation cannot be performed can be shortened.

INDUSTRIAL APPLICABILITY

A radio communication trunking system can be implemented which can reduce consumption current in accommodated wireless units and at the same time can significantly shorten the time period for which the trunk operation cannot be performed, and the system can be used in wide band radio communication networks.

The invention claimed is:

1. A control method for a trunking system performing exchange between a wireless unit and the other communication party by means of control signal communication with the wireless unit by use of a control channel, and thereby allowing communication signal communication using a selected telephone communication channel between the wireless unit and the other communication party, the control method comprising the steps of:

when all the telephone communication channels are busy when a new request for the telephone communication channel comes from the wireless unit, performing a telephone communication channel making processing for using the control channel as a telephone communication channel;

when any of the busy telephone communication channels is released when the control channel is used as a telephone communication channel, performing a control channel shifting processing for setting the released telephone communication channel as a new control channel, and by using all channels, notifying a plurality of the wireless units that the released telephone communication channel currently acts as a new control channel, and when the original control channel is used as a telephone communication channel, inserting information indicating a usage state of the telephone communication channel being used as the new control channel and a usage state of neighboring channels in an overlapped manner into information transmitted via the downlink communication of the original control channel so as to notify a wireless unit currently making a telephone call using the original control channel of these usage states, to perform a control channel usage state notifying processing.

* * * * *